United States Patent
Covelli et al.

(10) Patent No.: US 10,592,425 B2
(45) Date of Patent: Mar. 17, 2020

(54) VIRTUALIZING NVDIMM WPQ FLUSHING WITH MINIMAL OVERHEAD

(71) Applicant: VMware, Inc., Palo Alto, CA (US)

(72) Inventors: Doug Covelli, Cambridge, MA (US); Rajesh Venkatasubramanian, San Jose, CA (US); Richard Brunner, Olympia, WA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/971,929

(22) Filed: May 4, 2018

(65) Prior Publication Data

US 2019/0340133 A1 Nov. 7, 2019

(51) Int. Cl.
*G06F 12/10* (2016.01)
*G06F 12/1009* (2016.01)
*G06F 12/0804* (2016.01)

(52) U.S. Cl.
CPC ...... *G06F 12/1009* (2013.01); *G06F 12/0804* (2013.01); *G06F 2212/1032* (2013.01); *G06F 2212/657* (2013.01)

(58) Field of Classification Search
CPC .......... G06F 12/1009; G06F 2212/657; G06F 2212/1032; G06F 12/0804
USPC ....................................................... 711/206
See application file for complete search history.

(56) References Cited

U.S. PATENT DOCUMENTS 10,268,595 B1 * 4/2019 Bonzini .............. G06F 12/1009

* cited by examiner

*Primary Examiner* — Hua J Song

(57) ABSTRACT

Techniques for virtualizing NVDIMM WPQ flushing with minimal overhead are provided. In one set of embodiments, a hypervisor of a computer system can allocate a virtual flush hint address (FHA) for a virtual machine (VM), where the virtual flush hint address is associated with one or more physical FHAs corresponding to one or more physical memory controllers of the computer system. The hypervisor can further determine whether one or more physical NVDIMMs of the computer system support WPQ flushing. If so, the hypervisor can write protect a guest physical address (GPA) to host physical address (HPA) mapping for the virtual FHA in the page tables of the computer system, thereby enabling the hypervisor to trap VM writes to the virtual FHA and propagate those write to the physical FHAs of the system.

21 Claims, 4 Drawing Sheets

VIRTUALIZING NVDIMM WPQ FLUSHING WITH MINIMAL OVERHEAD

BACKGROUND

A non-volatile dual-inline memory module (NVDIMM), also known as "persistent memory" or "non-volatile memory," is an emerging type of computer memory that offers fast, byte-level access to data in a manner similar to volatile random access memory (e.g., DRAM), but retains its contents when system power is turned off or lost. NVDIMMs can be broadly classified into two types: NVDIMM-P and NVDIMM-N. NVDIMM-P makes use of a new class of physical memory, marketed under various names such as 3D XPoint, Crystal Ridge, etc., that can natively persist the data stored in its memory cells. On the other hand, NVDIMM-N makes use of traditional DRAM and an on-board or on-chip battery. When system power is turned off or lost, the battery powers the NVDIMM-N module for a short period of time, which enables the DRAM contents to be persisted to non-volatile storage (e.g., flash memory) during that period.

Certain variants of NVDIMM, such as NVDIMM-P modules developed and sold by Intel Corporation, support a feature known as write pending queue (WPQ) flushing. With this feature, an application that writes data to the NVDIMM(s) of a system can trigger an explicit flush of any pending write data in the queues/buffers of the memory controller(s) connected to the NVDIMM(s), thereby ensuring that such pending data is persisted (in case the system subsequently crashes or loses power). This generally involves issuing a WPQ flush command, which causes the system operating system (OS) to perform a write to a predefined flush hint address (FHA) specified in a system ACPI (Advanced Configuration and Power Interface) table, referred to as the flush hint address table (FHAT). The write to the FHA causes a flush to occur with respect to the queues/buffers of the memory controller associated with the FHA.

Other variants of NVDIMM, such as NVDIMM-N modules developed and sold by Hewlett-Packard, Inc., do not support or allow WPQ flushing. This is because these other NVDIMM variants are typically battery-backed and thus, when a system power failure or power loss event occurs, any pending write data in system caches, memory controller queues/buffers, and so on are automatically flushed by the system BIOS to non-volatile storage while the NVDIMM module(s) and other key system components run on battery power. Accordingly, there is no need to provide applications an explicit WPQ flush command in this case, since the NVDIMM platform is designed to perform this flushing autonomously.

SUMMARY

Techniques for virtualizing NVDIMM WPQ flushing with minimal overhead are provided. In one set of embodiments, a hypervisor of a computer system can allocate a virtual FHA for a VM, where the virtual FHA is associated with one or more physical FHAs corresponding to one or more physical memory controllers of the computer system. The hypervisor can further determine whether one or more physical NVDIMMs of the computer system support WPQ flushing. If so, the hypervisor can write protect a guest physical address (GPA) to host physical address (HPA) mapping for the virtual FHA in the memory page tables (e.g., nested page tables, extended page tables, etc.) of the computer system, thereby enabling the hypervisor to trap VM writes to the virtual FHA and propagate those write to the physical FHAs of the system.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for virtualizing NVDIMM WPQ flushing—in other words, enabling a virtual machine (VM) with one or more virtual NVDIMMs to issue WPQ flushes—in an efficient manner. Generally speaking, these techniques involve exposing, by a hypervisor, a FHAT to the guest OS of the VM with a virtual FHA that corresponds to a guest physical address of the VM. This virtual FHA emulates the actual physical FHA(s) of the host system running the VM. The hypervisor can then trap writes that are made by the guest OS to the virtual FHA and, upon trapping such a write (which indicates that the VM has issued a WPQ flush command), initiate a flush with respect to the actual FHA(s) of the host system, thereby persisting any pending write data in the queues/buffers of the memory controller(s) associated with those FHA(s) to the system's physical NVDIMM(s).

However, rather than performing this write trapping on every host hardware configuration, in certain embodiments the hypervisor can dynamically enable or disable the trapping based on whether the physical NVDIMM(s) of the host system support WPQ flushing or not. For example, if the physical NVDIMM(s) do support WPQ flushing (as is the case with, e.g., Intel-based NVDIMMs), the hypervisor can trap each virtual FHA write as mentioned above and propagate the flush command represented by the write to the underlying NVDIMM hardware. On the other hand, if the physical NVDIMM(s) do not support WPQ flushing (as is the case with, e.g., HP-based NVDIMMs), the hypervisor can simply allow the guest OS to write to the virtual FHA without performing any trapping. In this latter scenario, the performance overhead of the trap operation (which requires a costly context switch from the VM to hypervisor) is advantageously avoided, without incurring any loss in functionality (since the physical NVDIMM platform does not support WPQ flushing anyway).

The foregoing and other aspects of the present disclosure are described in further detail below.

2. Host System Architecture and High-Level Workflows

Figure 1:
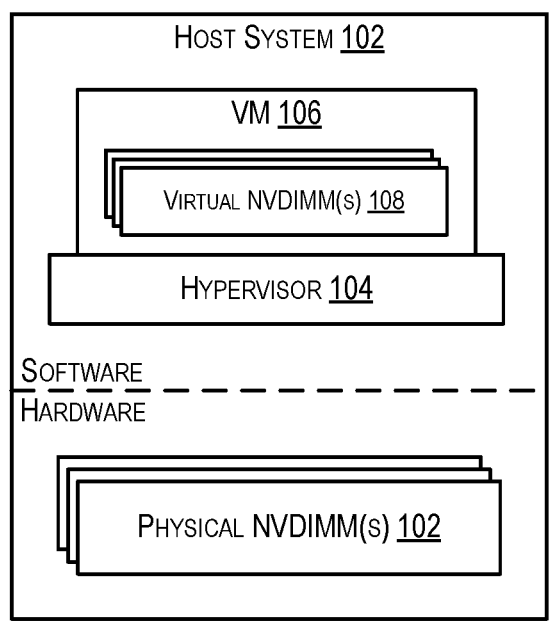
FIG. 1 depicts a host system according to an embodiment.

FIG. 1 is a simplified block diagram of a host system 100 in which embodiments of the present disclosure may be implemented. As shown, host system 100 includes one or more physical NVDIMMs 102, which are communicatively coupled to one or more physical memory controllers (not shown). Host system 100 also includes a virtualization software layer, or hypervisor, 104 that provides an environment in which a VM 106 can run. In the particular example of FIG. 1, hypervisor 104 exposes one or more virtual NVDIMMs 108 to VM 106, which are virtual (i.e., software-based) representations of physical NVDIMM(s) 102. VM 106 is assumed to access virtual NVDIMM(s) 108 as part of its runtime operation.

As noted in the Background section, some variants of NVDIMM support a platform feature known as WPQ flushing, which enables an application to explicitly flush pending write data in memory controller queues/buffers to the persistent memory/storage of the NVDIMM modules. This achieved by issuing a WPQ flush command, which causes the system OS to write to a specific memory address, referred to as a flush hint address (FHA), defined in the system's FHA table (FHAT). The FHA write, in turn, causes the queues/buffers of the memory controller associated with the FHA to be flushed.

Figure 2:
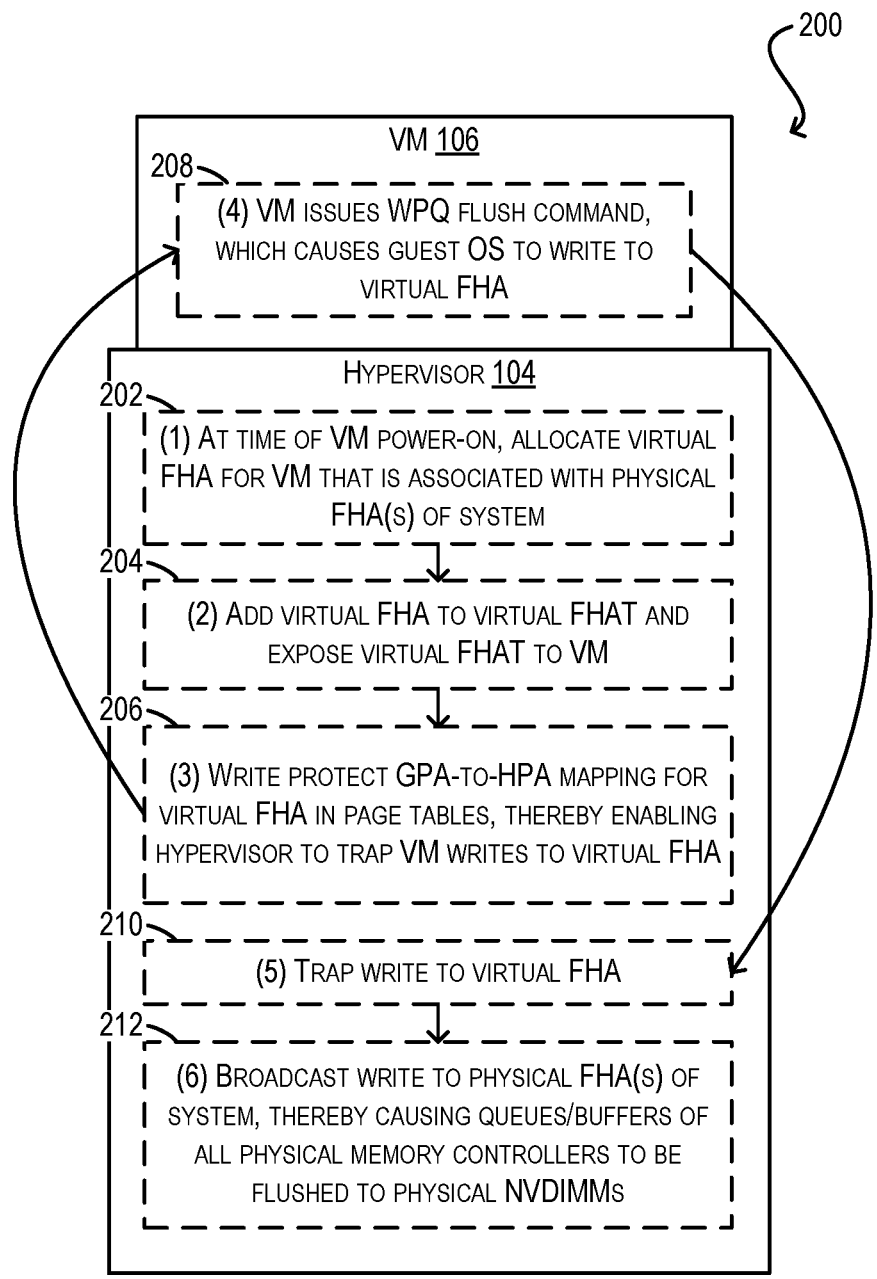
FIG. 2 depicts a high-level workflow for implementing virtualized WPQ flushing according to an embodiment.

For compatibility reasons, it is important that hypervisor vendors allow VMs with virtual NVDIMMs, such as VM 106 of FIG. 1, to also perform WPQ flushing with respect to their virtual NVDIMMs and thereby flush all of the data written to the virtual NVDIMMs to the underlying physical NVDIMMs of the host system. FIG. 2 depicts a high-level workflow 200 that can be carried out by hypervisor 104 of host system 100 to implement this virtualized WPQ flushing for VM 106 according to an embodiment.

Starting with step (1) of workflow 200 (block 202), hypervisor 104 can, at the time of VM power-on/boot up from a power-off (i.e., S5) state, allocate a virtual FHA for VM 106 that is associated with the actual (e.g., physical) FHA(s) of host system 100. In one set of embodiments, hypervisor 104 can perform this step by selecting a random guest physical address in the guest memory address space of VM 106 and assigning the randomly-selected guest physical address as the virtual FHA. In other embodiments, hypervisor 104 can allocate the virtual FHA from a predefined list or range of guest physical addresses.

At step (2) (block 204), hypervisor 104 can add the virtual FHA to a virtual FHAT and expose the virtual FHAT to VM 106 (thereby informing the VM's guest OS of this address). Hypervisor 104 can also write protect the guest physical address (GPA)-to-host physical address (HPA) mapping for the virtual FHA in the system's memory page tables (e.g., nested page tables or extended page tables), thereby allowing it to trap any VM writes to the virtual FHA (step (3); block 206). Hypervisor 104 can then allow VM 106 complete its boot up process and begin running.

At some point during its runtime, VM 106 (or a guest application running therein) can issue a WPQ flush command, which causes the guest OS to write to the virtual FHA (step (4); block 208). In response, hypervisor 104 can trap the write by virtue of the write protect flag set at step (3) (step (5); block 210). Finally, upon trapping the write, hypervisor 104 can broadcast a write to all of the actual FHA(s) of host system 100, thereby causing the queues/buffers of all memory controllers in the system to be flushed to physical NVDIMM(s) 102 (step (6); block 212).

It should be noted that workflow 200 of FIG. 2 assumes that the physical NVDIMM platform of host system 100 supports WPQ flushing and thus it is possible for hypervisor 104 propagate the VM-issued WPQ flush command to the underlying hardware per step (6) of the workflow. However, as mentioned previously, there are also certain NVDIMM variants, such as NVDIMM-N modules developed/sold by HP, that do not support WPQ flushing. For host systems that incorporate these "WPQ flush-incompatible" NVDIMM variants, workflow 200 is inefficient because it requires hypervisor 104 to incur a trap (and thus, expensive context switch) for each VM write to the virtual FHA, even though the underlying hardware cannot be flushed.

It is possible to mitigate this inefficiency by deploying VMs that make use of the WPQ flush command on host systems which are known to incorporate WPQ-flush compatible NVDIMMs. But, this solution is not foolproof because, in many large-scale VM deployments, VMs are live migrated on-demand between different, heterogeneous host systems for various reasons (e.g., load balancing, etc.). Thus, even if a VM that uses WPQ flush is initially deployed on a first host system that includes WPQ-flush compatible NVDIMMs, it may later be migrated to a second host system that includes WPQ-flush incompatible NVDIMMs, which raise the same inefficiency concerns as before.

Figure 3:
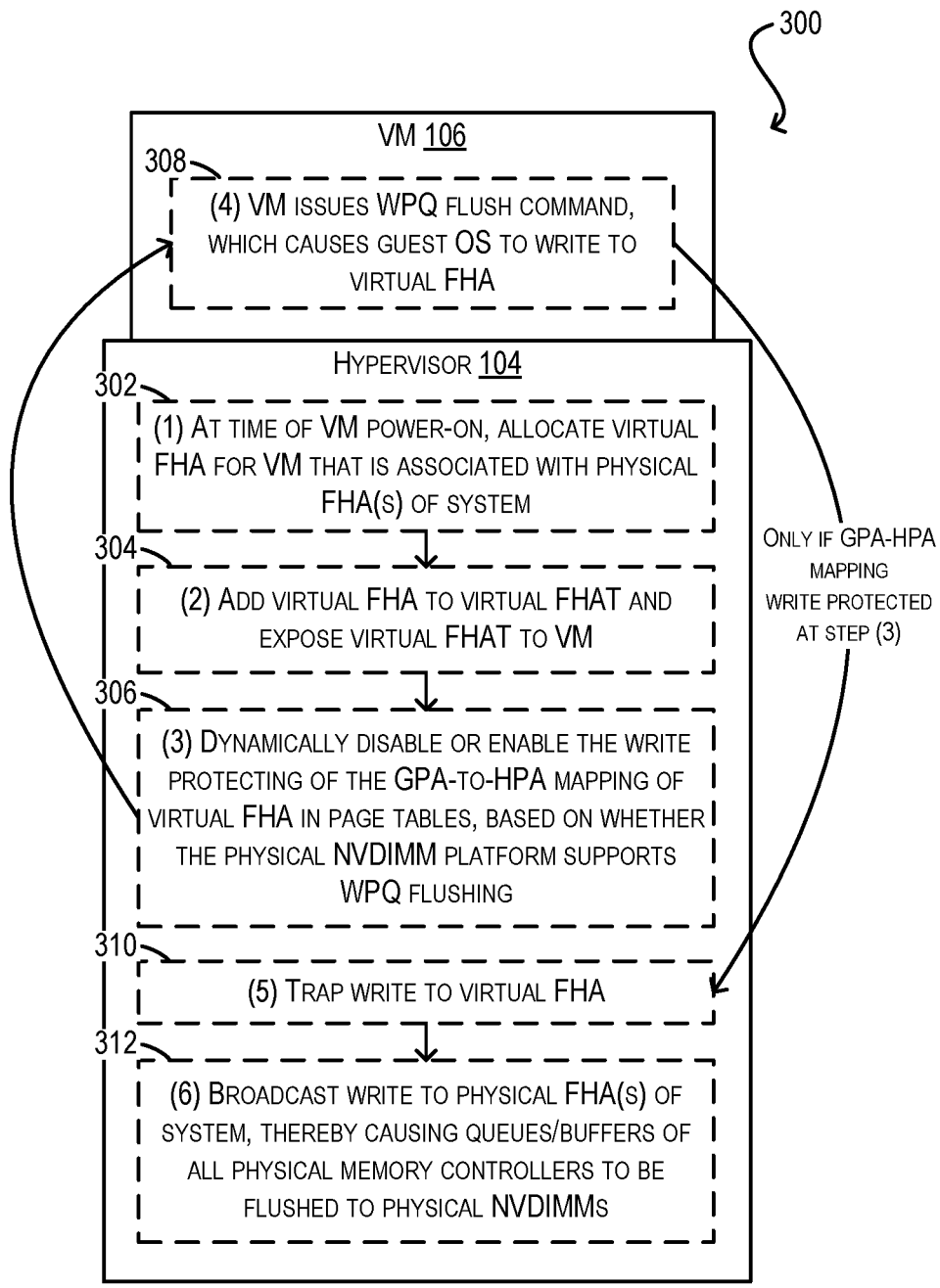
FIG. 3 depicts a high-level workflow for implementing virtualized WPQ flushing within minimal overhead according to an embodiment.

To address the foregoing and other similar issues, FIG. 3 depicts an enhanced version of high-level workflow 200 (identified as workflow 300) that enables VM 106 of host system 100 to perform virtualized WPQ flushing with minimal overhead, regardless of whether physical NVDIMMs 102 support WPQ flushing or not.

Steps (1) and (2) of workflow 300 are largely similar to steps (1) and (2) of workflow 200; however, at step (3) (block 306), hypervisor 104 can dynamically enable or disable the write protecting of the GPA-to-HPA mapping of the virtual FHA in the page tables (and thus, the trapping of VM writes to the virtual FHA) based on whether physical NVDIMM(s) 102 support WPQ flushing. Hypervisor 104 can determine whether physical NVDIMM(s) 102 support WPQ flushing via a number of different methods, such as by checking whether the system-level FHAT of host system 100 is empty (indicating that WPQ flushing is not supported) or non-empty (indicating that WPQ flushing is supported).

At step (4) (block 308), VM 106 can proceed with issuing an WPQ flush command, which causes the guest OS to write to the virtual FHA. Then, only if the GPA-to-HPA mapping for the virtual GHA was write protected at step (3), hypervisor 104 can trap the VM write and propagate the flush to the underlying NVDIMM hardware in a manner similar to workflow 200 (steps (5)-(6); blocks 310-312).

If the GPA-to-HPA mapping was not write protected at step (3) (in other words, write trapping for the virtual FHA was disabled), when VM 106 issues a WPQ flush command and the guest OS writes to the virtual FHA per step (4), hypervisor 104 will not trap the write and instead simply allow the VM to continue with its execution.

With workflow 300 of FIG. 3, a number of benefits are achieved. First, in cases where the physical NVDIMM(s) of the host system do support WPQ flushing, all of the actual (i.e., physical) WPQs of the system can be flushed with only a single context switch between the VM and hypervisor. This is because a write to the single virtual FHA causes writes to be broadcast to all of the actual FHAs of the system, thereby flushing the queues/buffers of all of the system's memory controllers (rather than just a single memory controller).

Second, in cases where the physical NVDIMM(s) of the host system do not support WPQ flushing, the performance overhead of trapping each write to the virtual FHA is eliminated (the only additional overhead is the cost of the single write instruction). This allows virtualized WPQ flushing to be efficiently implemented for VMs that may be freely migrated between host systems that incorporate different NVDIMM platforms (i.e., those that support WPQ flushing and those that do not).

It should be appreciated that FIGS. 1-3 are illustrative and not intended to limit embodiments of the present disclosure. For example, the various entities shown in these figures may be organized according to different arrangements/configurations, and/or may include sub-components or functions that are not specifically described. One of ordinary skill in the art will recognize other variations, modifications, and alternatives.

3. Detailed Implementation

Figure 4:
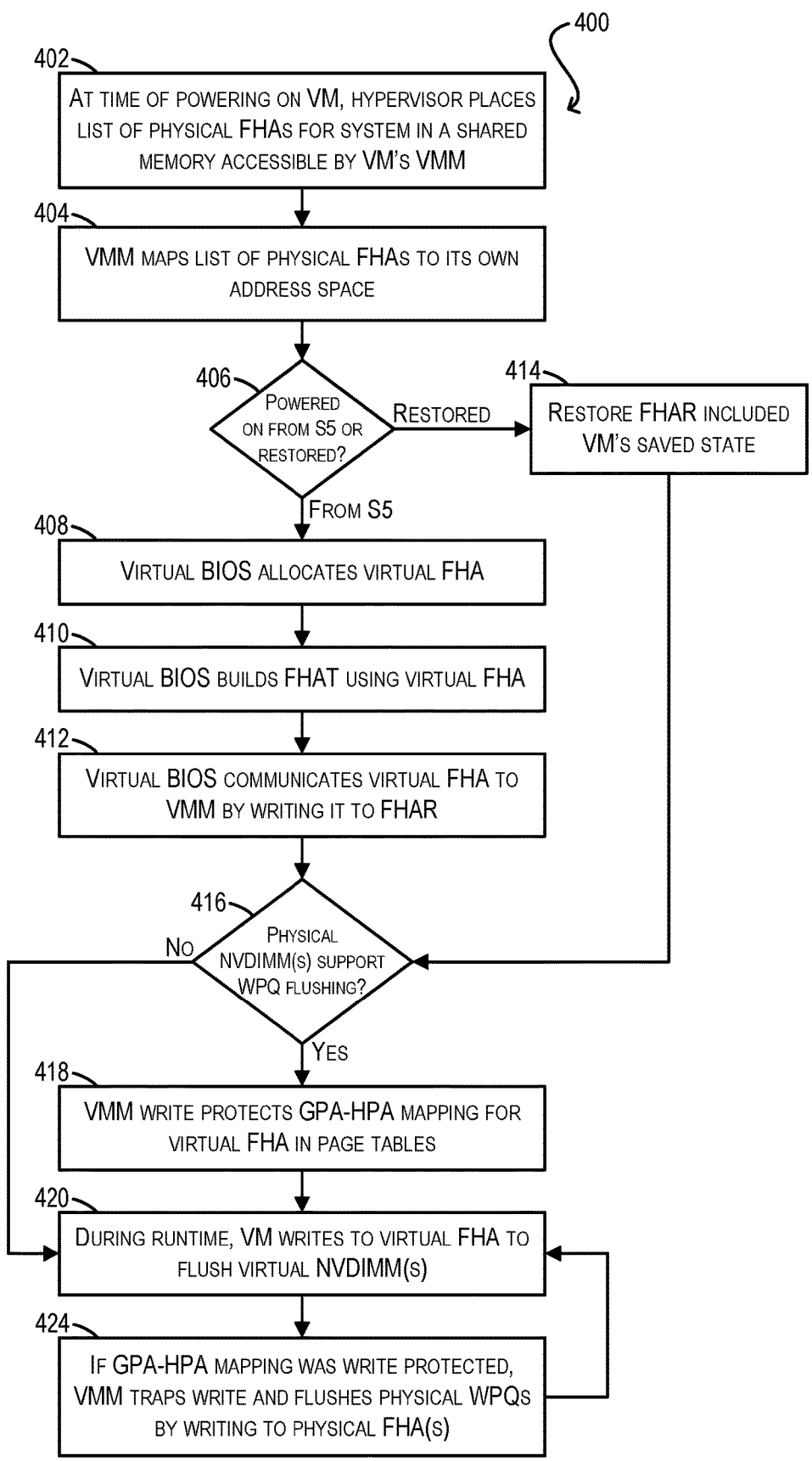
FIG. 4 depicts a flowchart for implementing the high-level workflow of FIG. 3 according to an embodiment.

FIG. 4 depicts a flowchart 400 that provides additional details regarding how high-level workflow 300 of FIG. 3 may be implemented according to an embodiment. In particular, flowchart 400 explains how certain components of hypervisor 104 (e.g., virtual machine monitor (VMM) and virtual BIOS for VM 106) may interact with each other and with VM 106 to achieve the steps of workflow 300, and includes an alternative path for the scenario where VM 106 is restored from a saved state, such as in the case of live migration. Like FIGS. 1-3, flowchart 400 is provided as an example and one of ordinary skill in the art will recognize that various modifications to this flowchart are possible.

Starting with block 402, at the time of powering-on VM 106, hypervisor 104 can place a list of physical FHAs for host system 100 in a shared memory accessible by the VM's VMM. In various embodiments, hypervisor 104 can receive this list of physical FHAs from the system BIOS. In cases where the physical NVDIMM platform of the system does not support WPQ flushing, this list can be empty.

At block 404, the VMM can map the list of FHAs into its own address space. Then, if VM 106 is being powered-on from a powered-off (S5) state (block 406), the virtual BIOS for VM 106 can allocate a virtual FHA for the VM (from the VM's guest memory space) (block 408), build a virtual FHAT using the virtual FHA (block 410), and communicate the virtual FHA to the VMM by writing the address to a register in a virtual NVDIMM controller maintained by the VMM (i.e., the flush hint address register, or FHAR) (block 412).

Otherwise, if VM 106 is being restored from a saved state (block 406), the VMM can restore the FHAR that was included in the VM's saved state at the time the VM's checkpoint was taken (or when the live migration was initiated) (block 414).

At block 416, the VMM can check whether the physical NVDIMM(s) of the system support WPQ flushing or not. If yes, the VMM can write-protect the GPA-HPA mapping for the virtual FHA in the system's page tables (block 418). If not, the VMM can simply ensure that the virtual FHA is mapped to a page of guest physical memory that can be safely written without causing a trap into the VMM (not shown).

Finally, at some point after boot VM 106 can write to the virtual FHA to flush the WPQs of its virtual NVDIMM(s) (block 420). If the physical NVDIMM(s) of the system support WPQ flushing (i.e., GPA-to-HPA mapping was write protected at block 418), this causes a trap into the VMM and the VMM can flush the physical WPQs by writing to the actual FHAs that were mapped into its address space at block 404 (block 422). The flowchart can then loop back to block 420 and blocks 420-422 can be repeated for each VM write to the virtual FHA. Note that if the physical NVDIMM(s) of the system do not support WQP flushing, no trap occurs at block 422 and thus there is no context switch from the VM to the VMM.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for virtualizing NVDIMM (non-volatile dual-inline memory module) WPQ (write pending queue) flushing with minimal overhead, the method comprising:
   allocating, by a hypervisor of a computer system, a virtual flush hint address (FHA) for a virtual machine (VM), the virtual FHA being associated with one or more physical FHAs corresponding to one or more physical memory controllers of the computer system, the allocating comprising:
      selecting a guest physical address from a guest address space of the VM;
      assigning the selected guest physical address to the virtual FHA;
      adding the virtual FHA to a virtual FHA table for the VM; and
      exposing the virtual FHA table to the VM;
   determining, by the hypervisor, whether one or more physical NVDIMMs of the computer system support WPQ flushing; and
   if the one or more physical NVDIMMs support WPQ flushing, write protecting, by the hypervisor, a guest physical address (GPA) to host physical address (HPA) mapping for the virtual FHA in a page table of the computer system.

2. The method of claim 1 wherein if the one or more physical NVDIMMs do not support WPQ flushing, avoiding the write protecting of the GPA to HPA mapping.

3. The method of claim 1 further comprising, at a time the VM issues a write to the virtual FHA:
   trapping, by the hypervisor, the write to the virtual FHA; and
   broadcasting, by the hypervisor, one or more writes to the one or more physical FHAs.

4. The method of claim 1 wherein the guest physical address selected from the guest address space of the VM is a randomly selected address.

5. The method of claim 1 wherein determining whether the one or more physical NVDIMMs support WPQ flushing comprises:
   determining whether a list of physical FHAs generated by a BIOS (Basic Input/Output) of the computer system is empty or non-empty.

6. The method of claim 1 wherein a single virtual FHA is allocated to the VM for multiple physical FHAs in the computer system.

7. The method of claim 1 wherein the guest physical address is selected from a predefined list or range of guest physical addresses in the guest address space of the VM.

8. A non-transitory computer readable storage medium having stored thereon program code executable by a computer system, the program code embodying a method for virtualizing NVDIMM (non-volatile dual-inline memory module) WPQ (write pending queue) flushing with minimal overhead, the method comprising:
   allocating, by a hypervisor of a computer system, a virtual flush hint address (FHA) for a virtual machine (VM), the virtual FHA being associated with one or more physical FHAs corresponding to one or more physical memory controllers of the computer system, the allocating comprising:
      selecting a guest physical address from a guest address space of the VM;
      assigning the selected guest physical address to the virtual FHA;
      adding the virtual FHA to a virtual FHA table for the VM; and
      exposing the virtual FHA table to the VM;
   determining, by the hypervisor, whether one or more physical NVDIMMs of the computer system support WPQ flushing; and
   if the one or more physical NVDIMMs support WPQ flushing, write protecting, by the hypervisor, a guest physical address (GPA) to host physical address (HPA) mapping for the virtual FHA in a page table of the computer system.

9. The non-transitory computer readable storage medium of claim 8 wherein if the one or more physical NVDIMMs do not support WPQ flushing, avoiding the write protecting of the GPA to HPA mapping.

10. The non-transitory computer readable storage medium of claim 8 wherein the method further comprises, at a time the VM issues a write to the virtual FHA:
    trapping, by the hypervisor, the write to the virtual FHA; and
    broadcasting, by the hypervisor, one or more writes to the one or more physical FHAs.

11. The non-transitory computer readable storage medium of claim 8 wherein the guest physical address selected from the guest address space of the VM is a randomly selected address.

12. The non-transitory computer readable storage medium of claim 8 wherein determining whether the one or more physical NVDIMMs support WPQ flushing comprises:
    determining whether a list of physical FHAs generated by a BIOS (Basic Input/Output) of the computer system is empty or non-empty.

13. The non-transitory computer readable storage medium of claim 8 wherein a single virtual FHA is allocated to the VM for multiple physical FHAs in the computer system.

14. The non-transitory computer readable storage medium of claim 8 wherein the guest physical address is selected from a predefined list or range of guest physical addresses in the guest address space of the VM.

15. A computer system comprising:
    a processor;
    one or more physical NVDIMMs (non-volatile dual-inline memory modules);
    one or more physical memory controllers; and
    a non-transitory computer readable medium having stored thereon program code for virtualizing NVDIMM WPQ (write pending queue) flushing with minimal overhead, the program code causing the processor to:
       allocate a virtual flush hint address (FHA) for a virtual machine (VM), the virtual FHA being associated with one or more physical FHAs corresponding to the one or more physical memory controllers, the allocating comprising:
          selecting a guest physical address from a guest address space of the VM;
          assigning the selected guest physical address to the virtual FHA;
          adding the virtual FHA to a virtual FHA table for the VM; and
          exposing the virtual FHA table to the VM;
       determine whether the one or more physical NVDIMMs support WPQ flushing; and if the one or more physical NVDIMMs support WPQ flushing, write protect a guest physical address (GPA) to host physical address (HPA) mapping for the virtual FHA in a page table of the computer system.

16. The computer system of claim 15 wherein if the one or more physical NVDIMMs do not support WPQ flushing, the write protecting of the GPA to HPA mapping is avoided.

17. The computer system of claim 15 wherein the program code further causes the processor to, at a time the VM issues a write to the virtual FHA:
  trap the write to the virtual FHA; and
  broadcast one or more writes to the one or more physical FHAs.

18. The computer system of claim 15 wherein the guest physical address selected from the guest address space of the VM is a randomly selected address.

19. The computer system of claim 15 wherein the program code that causes the processor to determine whether the one or more physical NVDIMMs support WPQ flushing comprises program code that causes the processor to:
  determine whether a list of physical FHAs generated by a BIOS (Basic Input/Output) of the computer system is empty or non-empty.

20. The computer system of claim 15 wherein a single virtual FHA is allocated to the VM for multiple physical FHAs in the computer system.

21. The computer system of claim 15 wherein the guest physical address is selected from a predefined list or range of guest physical addresses in the guest address space of the VM.

* * * * *